United States Patent [19]
Stewart

[11] Patent Number: 5,451,770
[45] Date of Patent: Sep. 19, 1995

[54] MACHINE CONTROLLER HAVING OPTICAL ELEMENTS WITHIN ANNULAR OPENINGS

[76] Inventor: Jack D. Stewart, 25 Oak Dr., Doylestown, Pa. 18901

[21] Appl. No.: 202,510

[22] Filed: Feb. 28, 1994

[51] Int. Cl.$^6$ ............................................. G01V 9/04
[52] U.S. Cl. .................................. 250/221; 250/229; 361/177
[58] Field of Search .................... 250/221, 229, 214 B, 250/239, 214 SW; 340/555, 556, 557; 361/177, 179

[56] References Cited

U.S. PATENT DOCUMENTS

| | | | |
|---|---|---|---|
| 2,228,780 | 1/1941 | Roberts | 250/221 |
| 2,962,633 | 11/1960 | Raymond | 317/135 |
| 3,056,030 | 9/1962 | Kelchner | 250/221 |
| 3,526,775 | 9/1970 | Friedrich et al. | 250/221 |
| 3,805,085 | 4/1974 | Andrews | 307/115 |
| 3,889,118 | 6/1975 | Walker | 250/221 |
| 4,054,935 | 10/1977 | Ginsberg | 361/189 |
| 4,091,438 | 5/1978 | Olding et al. | 361/189 |
| 4,412,268 | 10/1983 | Dassow | 361/181 |
| 4,812,674 | 3/1989 | Sue et al. | 307/116 |
| 4,918,560 | 4/1990 | Storer | 361/190 |
| 4,939,358 | 7/1990 | Herman et al. | 250/221 |
| 5,134,259 | 7/1992 | Page, Jr. | 200/341 |
| 5,168,173 | 12/1992 | Windsor | 307/139 |
| 5,367,158 | 11/1994 | Herman et al. | 250/229 |

OTHER PUBLICATIONS

Banner Advertisement, New Equipment Digest, Feb. 1994, p. 9.
Stewart Ergonomics, Inc. Feature Sheet for Model 12-2001 (Bulls-eye model) Feb. 6, 1994.
Stewart Ergonomics, Inc. Advertisement for Models 117-1001 and 117-1002, Dec. 1993.
Stewart Ergonomics, Inc. Advertisement for Model 12-2001 (Bulls-eye model) Mar. 1993.
Stewart Ergonomics, Inc. Advertisement for Model 12-2001 (bracket model) Mar. 1993.
Stewart Ergonomics, Inc. Advertisement for Model 12-1001, Jan. 1993.
Stewart Ergonomics, Inc. Flyer for "New Bulls Eye End Caps", Oct. 1993.
Break-A-Beam Inc. non-force machine actuator advertisement, Tooling and Production, Feb. 1994, p. 79.

*Primary Examiner*—Stephone B. Allen
*Attorney, Agent, or Firm*—Sperry, Zoda & Kane

[57] ABSTRACT

A solid state machine controller for actuating a machine. The machine controller requires near simultaneous interruption of two photo-optic beams by fingers from both operator hands to actuate the machine. The beams are part of switches located at opposite ends of a tubular enclosure. The photo-optic beams are located in annular openings surrounded by embossed rings to prevent beam generator and receiver soiling as well as accidental machine actuation.

9 Claims, 7 Drawing Sheets

TIMER PULSE OUTPUT & DEMONSTRATION OPTIONS

MACHINE CONTROLLER HAVING OPTICAL ELEMENTS WITHIN ANNULAR OPENINGS

BACKGROUND OF THE INVENTION

The present invention relates to machine controls and, more particularly, to a switch assembly for activating a machine.

Many types of automatic machinery such as hydraulic presses, injection molding machines, milling machines, grinders, and the like require the machine operator to place his or her hands between moving parts or within pinch points of a machine during each machine operating cycle to load and unload work pieces from the machine. It is therefore important for the safety of the machine operator that the machine be rendered incapable of actuation until the machine operators limbs, particularly, the operators hands and fingers are safely removed from between these moving parts. To ensure operator safety, it is well known in the art to use a widely spaced pair of switches which do not require exertive contact to initiate a machine cycle. The switches are spaced apart so a machine operator is forced to utilize both hands to activate the machine, thus, decreasing the possibility of the operator's hands being caught within the machine. It is also known in the art to use switches which are non-contact and non-exertive such as photo-optic switches to prevent repetitive motion injuries to the machine operator. U.S. Pat. Nos. 4,939,358 to Herman et al and 5,168,173 to Windsor are typical photo-optic machine controls which require that an operator utilize two hands to operate a machine.

However, several common problems exist with prior art photo-optic machine controls. Most controls have hand sensors which open skyward and are positioned to receive hands entering from above the sensor. In these, the upward facing sensor is susceptible to fouling from airborne dirt and dust and can be triggered accidentally by objects falling into the sensors.

Additionally, the American National Safety Institute (ANSI) requires that top mounted dual sensors on machine controllers be separated by at least 22 inches to preclude a person with large hands from triggering both sensors with one hand. This requirement has resulted in machine controllers which are greater than 22 inches long. Controllers greater than 22 inches long are not conveniently usable in operator positions where space is limited. In addition, the wide spacing of top mounted sensors can cause shoulder fatigue by diminutive controller users who must hold their arms spread wide apart when using the controllers. ANSI does permit end mounted sensors to be separated by only 10 inches but controllers having end mounted sensors are not common in the art.

Thus, a need exists for a solid state machine control which has sensors that are shielded from fouling by dirt and airborne dust, which are not susceptible to accidental machine actuation, and which are mounted such that the overall length of the machine control is less than 22 inches in length for use where space is limited and to reduce user shoulder fatigue.

SUMMARY OF THE INVENTION

It is an object of this invention to provide a solid state machine control having sensors shielded from fouling by dirt and airborne dust, which are not susceptible to accidental machine activation and which are mounted such that the overall length of the machine control is less than 22 inches.

To achieve the foregoing and in accordance with the purposes of the present invention as embodied and broadly described herein the present invention provides a solid state apparatus comprising, first and second switching circuits which respectively include annular openings for inserting at least one finger of each hand therein, and said circuits being activated by the insertion of said fingers; first and second semiconductor timing means respectively coupled to said respective first and second switching circuits; a semiconductor latching means coupled to said first and second timing means; a semiconductor amplifying means coupled to said latching means; a load connected to said amplifying means wherein said load is energized by an enhanced signal from said amplifying means, whereby the dual activation of said switching circuits within a specified time of each other initiates said timer and latching means, and causes said amplifying means to conduct through said load such that an operator can safely operate machinery through said load without danger to his limbs.

In one characterization of the present invention, said first and second switching circuits are activated by breaking a light beam located within said switching circuit.

In another characterization of the invention, said load comprises a coil for activating said machinery.

In another characterization of the invention, the apparatus also includes a second semiconductor amplifying means which is connected to said latching means and a second load, and said first and second amplifying means being connected to said latching means to provide an alternate action.

In another characterization of the invention, the apparatus also includes a second semiconductor amplifying means which is connected to said latching means and a second load, and said first and second amplifying means being connected to said latching means for simultaneously energizing both said load means.

In another characterization of the invention, the apparatus also includes a third semiconductor timing circuit whose input is coupled to an output of said second amplifying means, and whose output is coupled to said latching means, said third timing circuit re-setting said latching means after a specific period of time to turn off power to said load when said switches are being activated.

In another characterization of the invention, the apparatus also includes a third timing means which is initiated by a micro-switch coupled to said latching means, whereby said third timing means enables said load to be energized for a time adjustable up to a maximum of ten minutes.

In yet another characterization, the present invention provides a photo-optic control for operating a machine, said machine actuated by an electrical actuation signal, said control comprising a tubular enclosure having a first end and a second end and a bore therebetween; a first photo-optic switch attached to said tubular enclosure at said first end, said first photo-optic switch comprising: a first end cap; a first embossed ring surrounding a first tapered annular opening, said first ring attached to said first end cap; a first infrared generator mounted within said first embossed ring so as to emit a first infrared beam which bisects said first annular opening; a first infrared receiver mounted within said first embossed ring diametrically opposed to said first infrared generator for receiving said first infrared beam; a first digital switch circuit, a second photo-optic switch attached to said tubular enclosure at said second end, said second photo-optic switch comprising: a second end cap; an second embossed ring with a second tapered annular opening, said second ring attached to said second end cap; a second infrared generator mounted within said second ring so as to emit a second infrared beam which bisects said second annular opening; a second infrared receiver mounted within said second ring diametrically opposed to said second infrared generator for receiving said second infrared beam; and a second digital switch circuit; and a digital solid state control circuit electronically connected to said first and second digital switch circuits, the output of said switch circuits activating said control circuit, said control circuit actuating said machine upon near simultaneous interruption of receipt of said first and second infrared beams by said first and second infrared receivers.

In yet another characterization, the invention provides a solid state switching apparatus comprising a first and second timing means having respective input and output terminals; a first RC circuit coupled to the input terminal of said first timing means; a second RC circuit coupled to the input terminal of said second timing means, and the time constant of said second RC circuit is longer than that of said first RC circuit; means for generating a light beam coupled to the output terminal of said first timing means, and said first RC circuit controlling periodic flashing of said beam; and means for receiving said light beam, and said receiving means coupled to the input of said second timing means; whereby a deliberate interruption of said flashing beam is required to activate the output of said switching apparatus.

In yet another characterization, the present invention provides a photo-optic switch for operating a machine activated by an electrical activation signal, said switch comprising: an end cap; an embossed ring with a tapered annular opening, said ring attached to said end cap; an infrared generator mounted within said embossed ring so as to emit an infrared beam which bisects said annular opening; an infrared receiver mounted within said embossed ring diametrically opposed to said infrared generator for receiving said infrared beam; a base plate, attached to said housing for mounting said switch to a machine; and a solid state circuit electrically connected to said photo-optic switch.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings.

DESCRIPTION OF THE PREFERRED EMBODIMENTS

Figure 1:
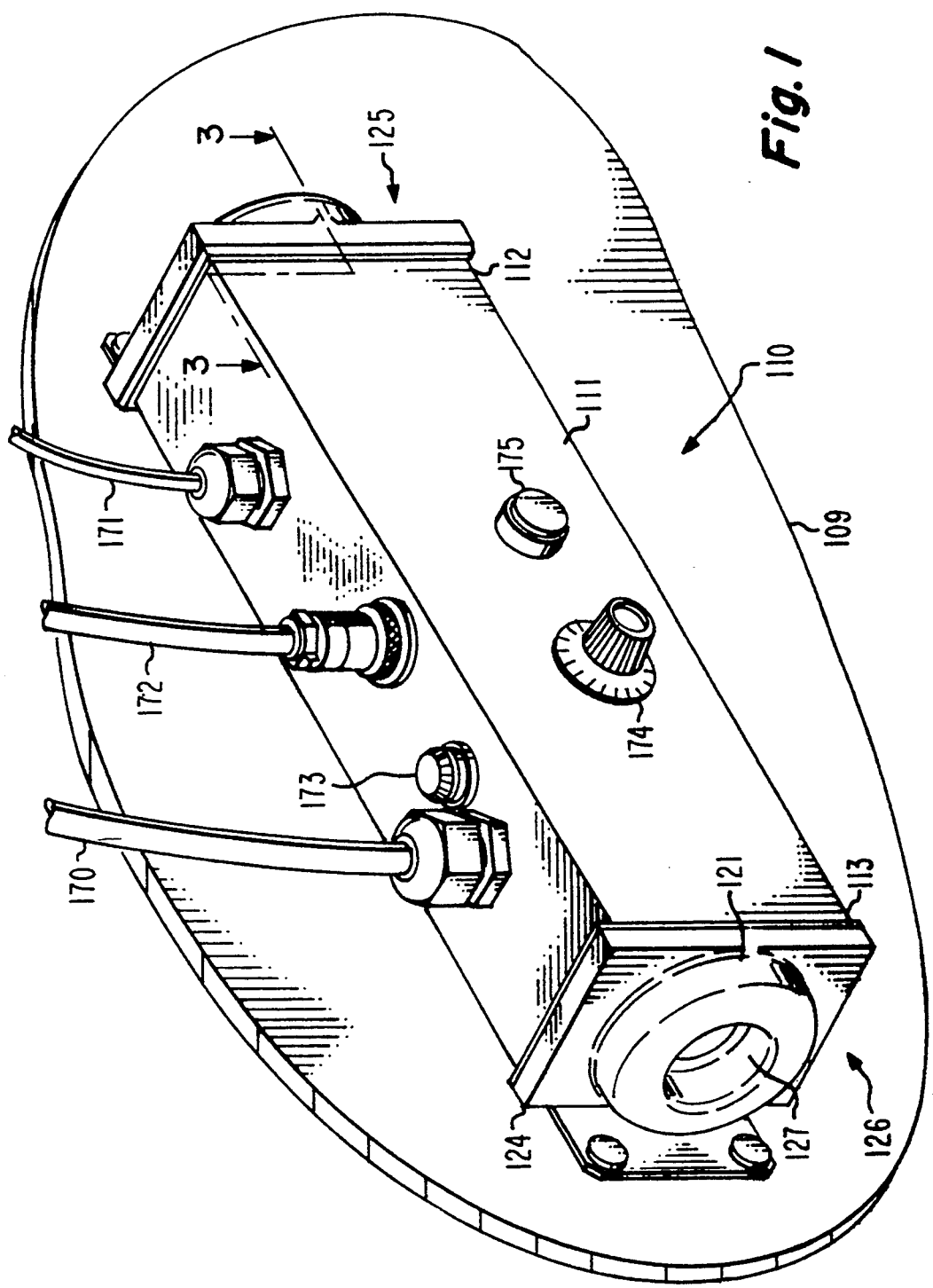
FIG. 1 is a perspective view of the solid state machine controller shown attached to a cut-away portion of a machine.
Figure 2:
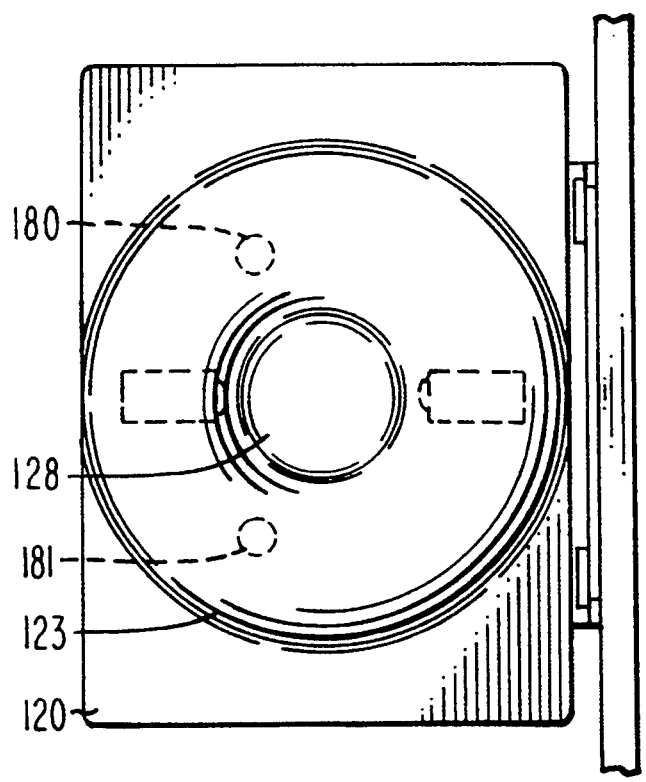
FIG. 2 is a side view of the solid state machine controller of FIG. 1.
Figure 3:
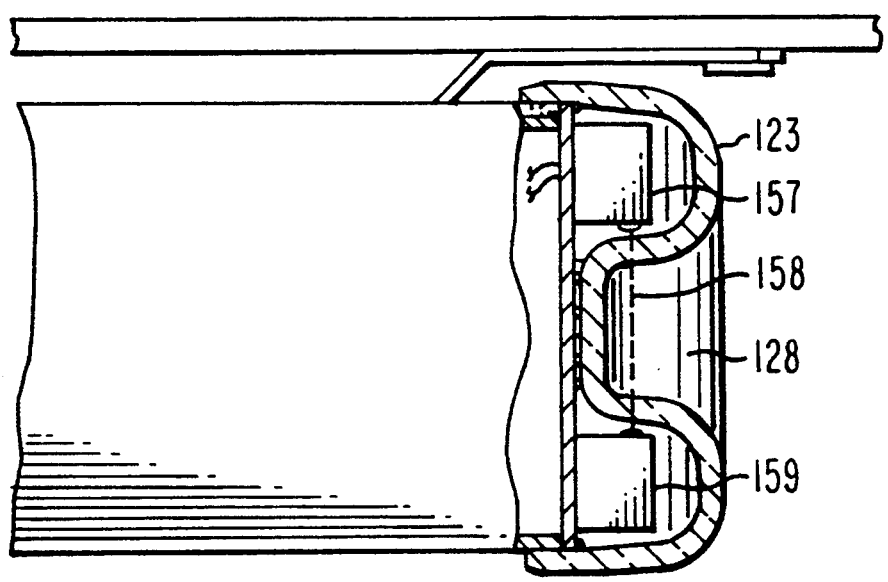
FIG. 3 is a cut-away sectional view of the controller taken along lines 3—3 of FIG. 1.

The solid state machine control of the present invention is shown generally in FIG. 1 as 110. Control 110 is shown attached to a cut-away portion of a machine 109 which is actuated by control 110. Such machinery may consist of a press or the like where the operator may be vulnerable to a crushing of fingers or a hand in case of accidental activation, or an inadvertent or absent-minded powering of the machinery where the operator's hands are not in a safe position. Control 110 is comprised of a tubular enclosure 111, a first photo-optic switch shown generally as 125, a second photo-optic switch shown generally as 126 in FIG. 1, and solid state electrical circuitry shown generally as 100 in FIGS. 5A and 5B. Enclosure 111 shown in FIG. 1 has a first end 112 and a second end 113. First photo-optic switch 125 is attached to enclosure 111 at end 112. Switches 125 and 126 are identical. Switch 125 shown in detail in FIGS. 2 and 3 is comprised of an end cap 120, an infrared generator 157, an infrared beam receiver 159, an embossed ring 123 surrounding a tapered annular opening 128 and digital solid state electrical circuitry shown generally as 300 in FIG. 6. Infrared generator 157 is positioned so that the infrared beam 158, shown in FIG. 3, produced by generator 157 bisects annular opening 128 and is received by infrared receiver 159. Receiver 159 is positioned diametrically opposed to generator 157 across annular opening 128. Opening 128 is constructed to guide insertion of a single finger between generator 157 and receiver 159 so to interrupt receipt of beam 158 by receiver 159.

Second photo-optic switch 126 is attached to enclosure 111 at end 113. Switch 126 is identical in form and function to switch 125 and is comprised of an end cap 124, an infrared generator (not shown), an infrared beam receiver (not shown), an embossed ring 121 surrounding a tapered annular opening 127, and solid state electrical circuitry 300 shown in FIG. 6. The infrared generator is positioned so that an infrared beam (not shown) produced by the generator bisects annular opening 127 and is received by the infrared receiver. The receiver of switch 126 is positioned diametrically opposed to the generator across annular opening 127. Opening 127 is constructed to guide insertion of a single finger between the generator and receiver of switch 126 so as to interrupt receipt of the beam by the receiver.

Figure 5A:
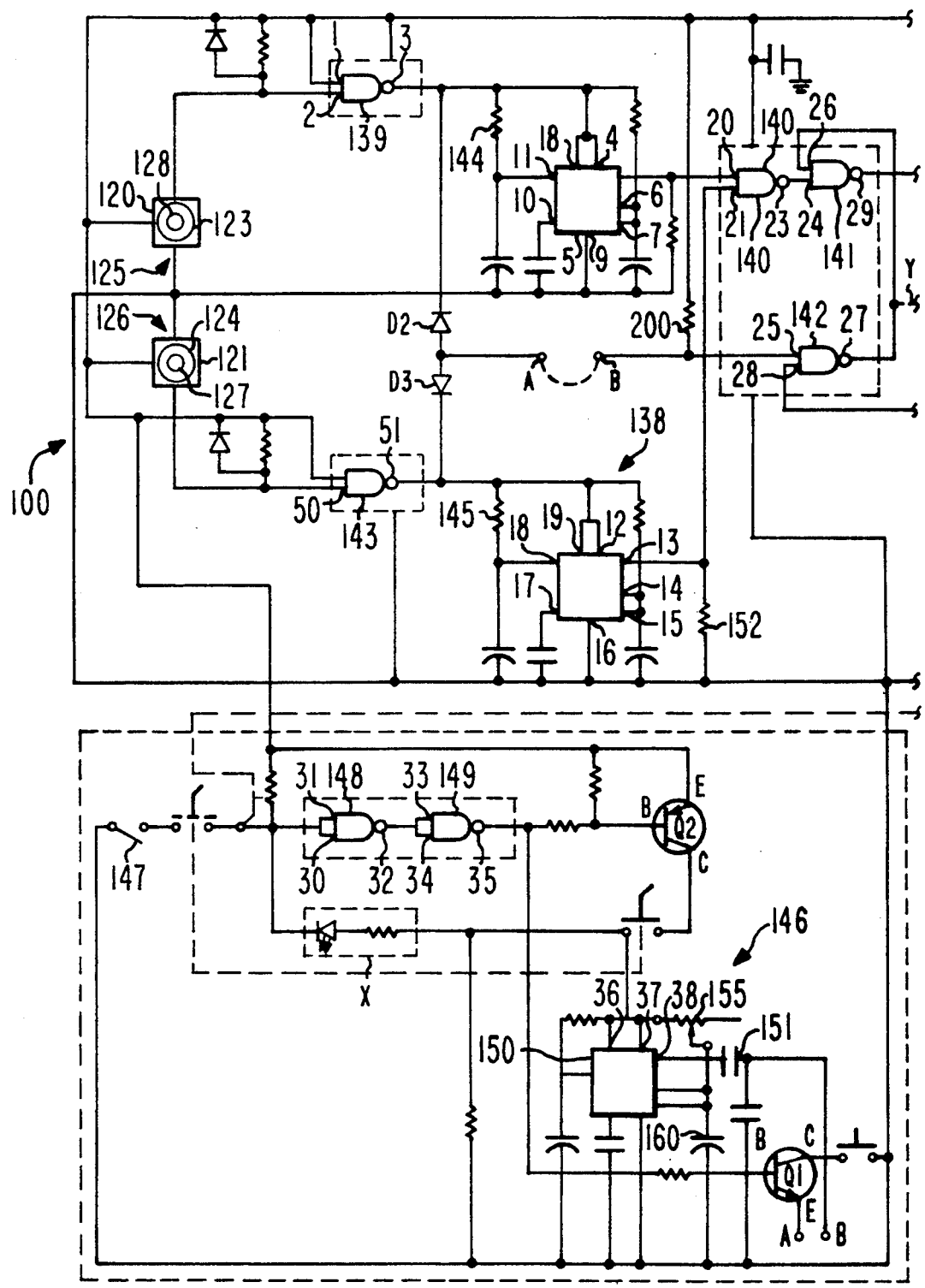
FIG. 5A is one portion of a diagram of a solid state circuit utilized with the photo switches of the invention.
Figure 5B:
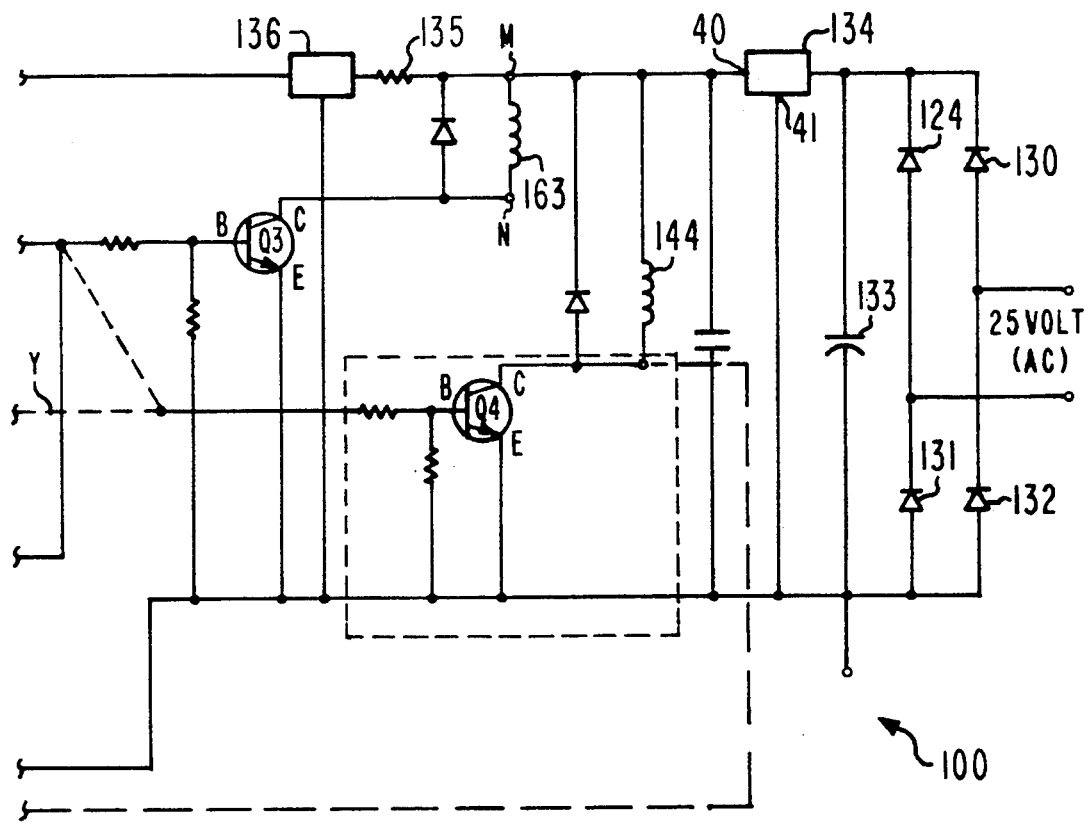
FIG. 5B is the remaining diagrammatic portion of said circuit utilized with the photo switches of the invention.
Figure 6:
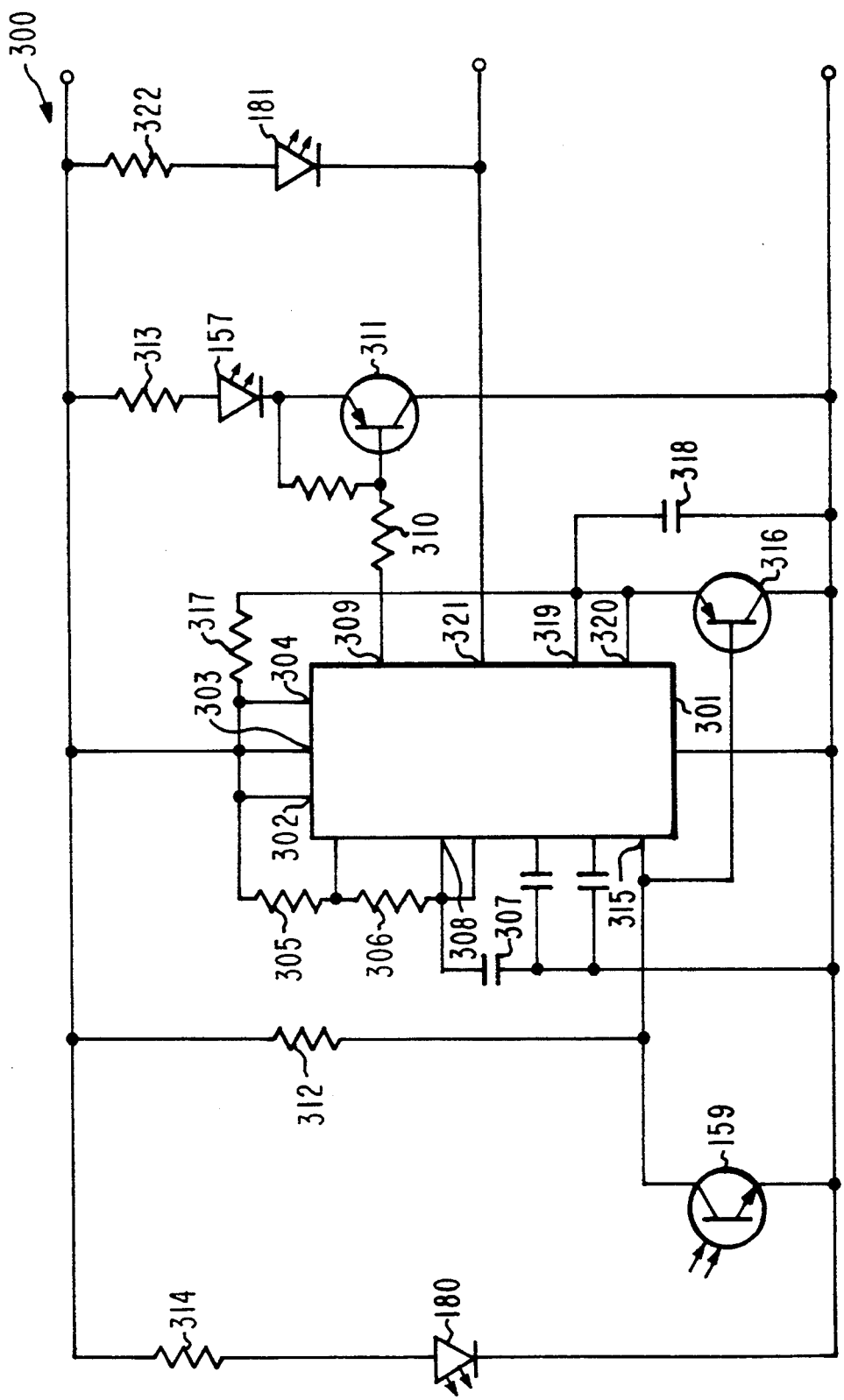
FIG. 6 is a diagram of a solid state circuit which is employed with an infrared beam generator and receiver as utilized in this invention.
Figure 7:
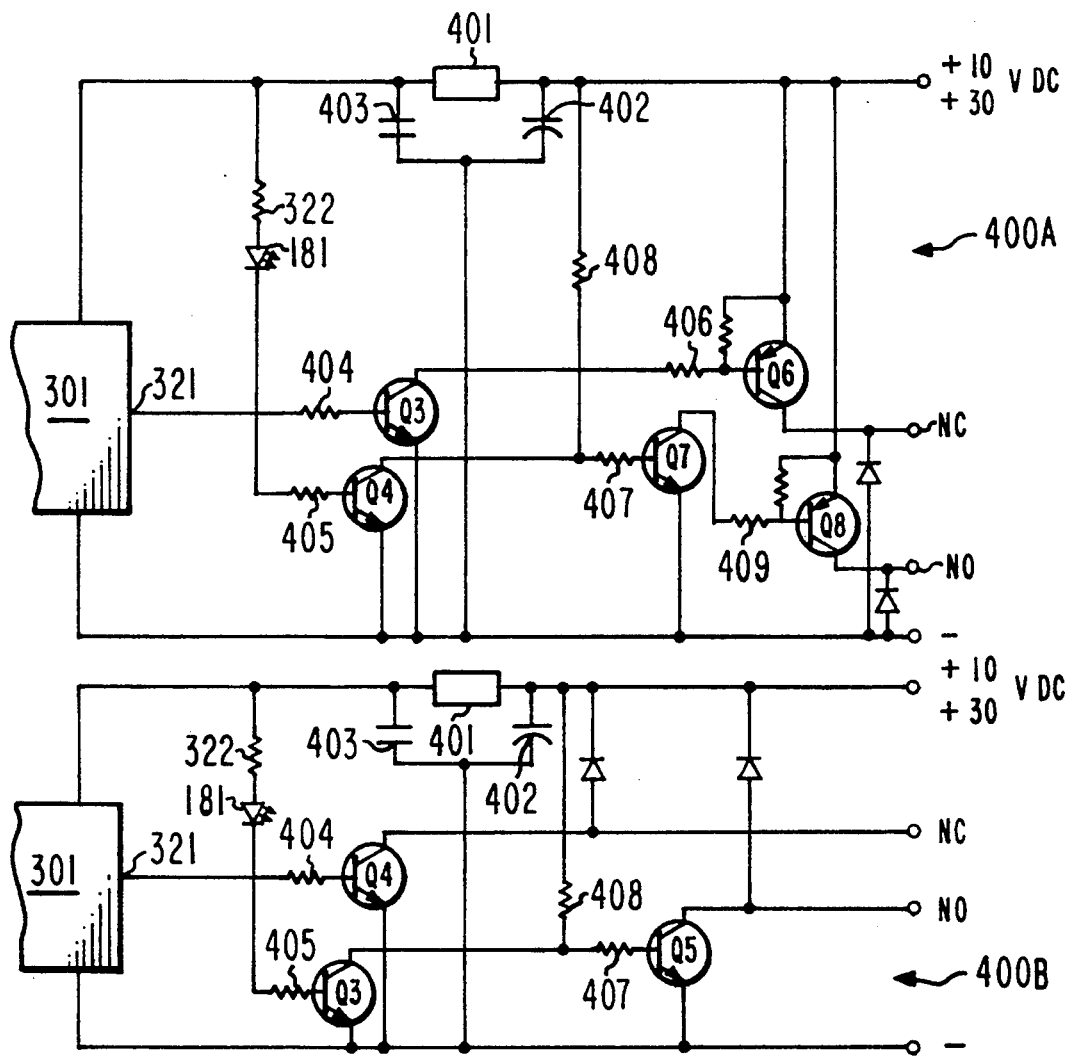
FIG. 7 is a diagram of a solid state circuit utilized in this invention.

Two circuits 300 (FIG. 7) are coupled to switches 125 and 126 (FIGS. 1, 5A, and 5B). One circuit 300 is coupled to switch 125 and one circuit 300 is coupled to switch 126. The two circuit 300's join switches 125 and 126 to solid state control circuit 100. Circuit 300, as shown in FIG. 7, consists of a dual timer 301 which is a commercially available dual timer such as Model 556 made by National Semiconductor. In the quiescent state, +12 DC volts is supplied from the 12 volt regulator 136 of circuit 100. This voltage is applied to inputs 302, 303, and 304 of dual timer 301. Resistors 305 and 306, together with capacitor 307, form a timer circuit which through trigger input 308 causes output 309 to go high (H) about 10,000 times each second. The percentage of on time is regulated by a ratio of resistor 305 divided by resistor 306. This causes PNP transistor 311 to conduct through resistor 310 turning on the infrared generator 157 which has series resistor 313 regulating its output to about 2.35 amps. This high power, short duration pulse of the infrared beam 158 is picked up by infrared receiver transistor 159 which takes trigger pin 315 low (L), output pin 321 H and causes PNP transistor 316 to discharge capacitor 318 which was being charged through resistor 317.

When a finger is inserted into the annular opening 128 of end cap 125, it interrupts infrared beam 158 received by infrared receiver transistor 159. This leaves input 315 pulled up by resistor 312 in the H state and in turn PNP transistor 316 cannot conduct as its base is also H. Capacitor 318 can continue to charge through resistor 317 until inputs 319 and 320 are above 8 volts, causing the second half of dual timer 301 to time out, which takes output pin 321 L. When output 321 is L, orange LED 181 shown in FIG. 2 turns on through resistor 322, indicating that the switch output is L. LED 180 shown in FIG. 2 is always energized through resistor 314 to indicate that power is on.

Solid state circuit 100 shown in FIGS. 5A and 5B is coupled to photo-optic switches 125 and 126. Switches 125 and 126 require that a finger be inserted into annular opening 127 and 128 therein in order to interrupt the photo-optic beams before the designated machinery (not shown) may be properly activated; furthermore, these switches must be broken for a minimum time, since they do not react to a fleeting action.

The solid state circuitry 100 shown in detail in FIGS. 5A and 5B is coupled to switches 125 and 126 and is energized through a power supply which plugs into a 115 volt alternating current (AC) wall outlet (not shown) via power supply cable 170, shown in FIG. 1. Fuse 173 is connected between 170 power supply cable and a step down transformer which reduces the AC voltage to 25 volts and isolates circuit 100 from the power grid. The 25 AC voltage is applied through a full bridge rectifier provided by four interconnected diodes 129,130,131,132 which converts the AC voltage to a direct current (DC) voltage. The DC voltage is filtered and smoothed by filter capacitor 133. The DC voltage is properly controlled by regulator 134. The current emanating from regulator 134 is provided for the positive side of solenoid 163 and passes through resistor 135 which drops the 24 DC voltage to 18 volts. Alternatively, the 24 volt DC may be supplied directly to pins 40 and 41 of regulator 134 from an outside source. This option eliminates regulator 134 along with diodes 129, 130, 131, 132, and capacitor 133. Regardless of the 24 volt DC source, after passing through resistor 135, the current passes through regulator 136 where it is reduced to 12 volts for the digital solid state circuitry.

The circuitry of FIGS. 5A and 5B is essentially comprised of two timing circuits shown generally as 137 and 138 which are utilized in combination with switches 125 and 126 to determine safe operation of the machinery. Switches 125 and 126 must be activated by an operator within a time frame as determined by timing circuits 137 and 138 before the machinery can be activated to assure that respective fingers of the operator's hands are respectively positioned within annular openings 127 and 128. Therefore, the machinery such as a press can operate without a possibility of an accident to the hands of the operator.

Figure 5C:
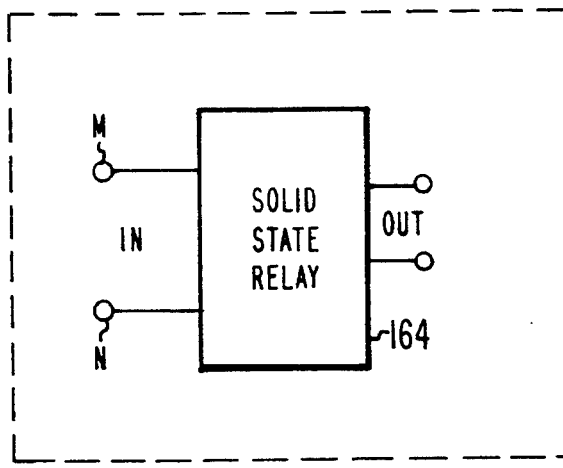
FIG. 5C is a diagram of a solid state relay.

When the circuitry coupled to annular switches 125 and 126 is in a quiescent state inputs 1,2 of a NAND gate 139 are at 12 volts or H, output 3 of the NAND gate 139 is therefore L. The L signal is respectively applied to input terminals 4,8 of the timing circuit 137. Timing circuit 137 can be any commercially available timing circuit such as model 555 made by National Semiconductor. An output terminal 5 of the timing circuit 137 is L during the quiescent state and is applied to input terminal 20 of NAND gate 140. The output of timer 137 is L in view of L input signals at terminals 4,8. Input terminal 21 of NAND gate 140 is also L via its connection with output 13 of timer 138 which replicates the operation of timer 137. Since inputs 20 and 21 of gate 140 are both L, its output 23 is H; the H signal is applied to input 24 of NAND gate 141. NAND gate 142 has a L level signal applied to input 25 via jumper "A-B" through diodes $D_2$ and $D_3$, which are tied to output 3 of NAND gate 139 and output 31 of NAND 143 which are L. Pull-up resistor 200 is held L by these diodes. Gates 141 and 142 are interconnected to form a latching circuit. The second input at terminal 26 of gate 141 is H since it is connected to output 27 of gate 142. Output 27 of gate 142 is H since inputs 25 and 28 are both L, respectively. The output 29 of NAND gate 141 is therefore L since both inputs are H and the L output is directed into the base (B) of an NPN transistor Q3 via a resistor. The Q3 transistor is the main output transistor of the circuit but does not conduct at this time since the base-emitter (B-E) junction does not have the proper voltage applied thereto. Since the B-E junction of transistor Q3 does not have the proper voltages applied thereto, current is not conducted through the C-E junction; hence, a conductive path is not provided between the 24 volt supply to ground via transistor Q3 and solenoid coil 163. The solenoid coil 163 operates a valve (not shown) in a preferred embodiment for activating machinery. At this time in the operation of the circuitry just described, the press machinery cannot operate since the coil 163 is not activated. Although the load is shown by solenoid coil 163, an optional form of the load may be a solid state relay as shown by solid state relay 164 in FIG. 5C.

In order to activate the machinery, both photo-optic switches 125 and 126 require a finger of each hand be deliberately inserted into their respective annular openings 127 and 128. When both fingers are properly inserted into openings 127 and 128, an infrared beam will be interrupted in each unit. The interruption of the beam in switches 125 and 126 takes input 2 of NAND gate 139 and input 50 of NAND gate 143 down to ground or L. Inputs 1 and 50 of respective gates 139 and 143 remain H since they are connected to the 12 volt DC supply, and this circuit input action causes output terminals 3 and 51 to be driven H.

The H signals emanating from gates 139 and 143 are respectively applied to terminals 4,8 and 12,19 of the timers 137 and 138 and are necessary for initiating the timing function. The H signals from gates 139 and 143 are also applied to diodes $D_2$ and $D_3$, thus causing pull-up resistor 200 to bring H input 25 of NAND gate 142, setting up NAND gates 141 and 142 to respond to H signals at inputs 20 and 21 of NAND gate 140. Timers 137 and 138 are designed to produce a H output signal at their output terminals 5 and 13 for a period of about 300 milliseconds. Therefore, both H signals must be simultaneously applied to inputs 20 and 21 of NAND gate 140 within about one-third of a second. In other words, photo switches 125 and 126 must have fingers of each hand inserted into annular openings 127 and 128 within one-third of a second of each other in order to activate the machinery which is being controlled. The action of the circuitry which causes both photo switches 125 and 126 to be broken within one-third of a second assures operator safety especially to the hands when machinery such as a press is being operated.

When both input signals 20 and 21 of NAND gate 140 are H, the output terminal 23 is driven L and is applied to input terminal 24 of NAND gate 141. Output 29 becomes H which is fed back to input 28 of NAND gate 142. Output 27 reverts to a L state since both inputs are H and is fed back to input 26 to perform a latching function. The H signal at output 29 is applied to the B electrode of transistor Q3. When the B electrode is positive with respect to the E electrode, current flows from the 24 volt supply to ground via the coil 163 and the C-E junction. This current flow powers the coil 163 associated with the valve (not shown) and energizes the press machinery. Should either finger be removed from the annular openings 127 and 128 of switches 125 and 126, an L signal is immediately applied to diode $D_2$ and/or $D_3$ taking input 25 of NAND gate 142 L. This causes output 28 of NAND gate 142 and output 29 of NAND gate 141 to go L to turn off Q3. This stops current flow through coil 163 and causes the press to open.

An optional circuit referred to as alternate action has been provided by adding an additional transistor Q4 in combination with an additional coil 144. In this optional circuitry, transistor Q4 is always conducting in the quiescent state, whereas transistor Q3 is not conducting. Q4 is always conducting quiescently since its B electrode is connected to the line connecting terminals 26 and 27 of respective NAND gates 142 and 141 which is H. This allows current to flow from the 24 volt supply to ground via coil 144 and the C-E junction of Q4. At this time, transistor Q3 is not conducting since its B electrode is connected to output 29 of NAND gate 141 which is L quiescently.

When the latching circuit consisting of NAND gates 140, 141, and 142 becomes operative, output 29 reverts to a H state which causes Q3 to conduct; also, the line connecting terminals 26 and 27 change to a L state and causes Q4 to stop conducting. This flip-flop or alternate action between Q3 and Q4 is required when it is necessary to operate a hydraulic press powered by a pump utilizing a double solenoid, spring centered valve. This type of valve is frequently found on economically priced "power packs". The spring centered position permits oil in a hydraulic machine to go directly to the machine's oil tank by the machine's connecting pressure and tank ports while blocking the machine's cylinder ports. The result is that hydraulic power packs operate cooler.

The purpose of Q4 is to open a press. A normally closed micro type switch is usually inserted in place of jumper Y to turn off Q4 when the press is open, permitting the press valve to center. If the press drifts down, Q4 will immediately turn on to re-open it.

Another option that may be provided in the present control circuitry is designated as the pulse timer 146. This option is used when it is required to stop the press machinery after just one cycle of operation. This option is also used for starting of automatic pneumatic drills, screwdrivers, and other devices requiring a pulse such as a pulse of air instead of continual output. In this option, the B electrode of Q3 and Q4 are both connected to output 29; thus both conduct and turn off together. The E electrode of Q4 is connected to ground and the C electrode is connected to input 30 and 31 of NAND gate 148, in place of micro-switch 147 which is not used. Therefore, when Q4 conducts inputs 30 and 31 are L. Output 32 of NAND gate 148 is therefore H which is fed as an input to terminals 33 and 34 of NAND gate 149; accordingly, output 35 of NAND gate 149 changes to a L voltage. This L voltage is applied to the B electrode of Q2. The L signal applied to PNP transistor Q2 causes it to conduct. The turn-on of transistor Q2 enables the C electrode to go H and this signal is applied to inputs 36 and 37 of timer 150. Output 38 of the timer 150 therefore goes H for a period of time determined by resistor 155 and capacitor 160 which is typically 100 milliseconds. When output 38 of timer 150 goes L at the end of the timing period, it is coupled to terminal B by capacitor 151. When terminal B goes L, it takes input 25 of NAND gate 143 L. This causes output 28 of NAND gate 142 and output 29 of NAND gate 141 go L turning off Q3 and Q4.

This option enables the timer 146 to overcome the operator's continued placement of his fingers in switches 125 and 126. This is useful for single cycle operations and for starting pneumatic and other devices requiring a short pulse, as opposed to a continuous signal.

Another option is the timer. In this instance, Q4 is not utilized and Q1 is installed in place of the A-B jumper. In this embodiment, the circuit operates in the normal manner with Q3 causing coil 163 to turn on, closing the press or transfer station. Upon closing or moving into position, micro-switch 147 is closed causing inputs 30 and 31 of NAND gate 148 to go L. Output 32 will go H causing inputs 33 and 34 of NAND gate 149 to go H and output 35 of NAND gate 149 to go L. The L voltage is applied to the B electrodes of transistors Q1 and Q2, respectively. The L signal applied to PNP transistor Q2 causes it to conduct, where as the same signal applied to the B electrode of NPN transistor Q1 causes it to stop conducting, isolating terminal A from terminal B. Turn on of transistor Q2 enables C electrode to go H. This signal is applied to inputs 36 and 37 of timer 150 and anode of LED X found in emergency stop switch 175, shown in FIG. 1, turning it on indicating that E stop is available to stop the cycle and that the operator may remove fingers from the annular openings of switches 125 and 126. Output 38 of timer 150 goes H when inputs 36 and 37 are H. This output will remain H until the timer times out, then it will take terminal B L through capacitor 151. It should be noted, however, that the timer circuit 150 includes a potentiometer 155 which is connected to ground via a capacitor 160. The R-C combination allows the timer circuit 150 to be varied from 0–10 minutes. This is useful to provide versatility in certain manufacturing processes as briefly described below. The timer circuit 150 is varied by control knob 174 shown in FIG. 1.

For example, it may be required that in a laminating process the press machinery be held closed for a period of ten minutes after the press machinery has been initially closed. Accordingly, output 38 of timer 150 will remain H for this designated time period and will remain so until it goes L when timer 150 times out. Hence, the latch circuit will remain latched even though operator has removed one or both fingers from annular openings of switches 125 and 126. The operator may, however, at any time touch the lighted emergency stop switch 175 to bring B terminal L, stopping the cycle. However, after the desired ten minutes, terminal B will go L and will be applied to input 25 of NAND gate 142 to unlatch the circuit. When this occurs, Q3 turns off, turning off coil 163 causing the press to open, the transfer station to return, opening micro-switch 147 and resetting the circuit to the quiescent state.

Thus, as described above, the invention provides a controller with an LED indicator to indicate to the machine operator that the finger placement into the annular openings 127 and 128 of switch 125 and/or 126 may now be removed and the press will open automatically at the end of the pre-set time.

Another option that may be provided with this circuit is machine pressure or temperature sensing. The press is closed in the usual manner, making micro-switch 147 to turn on Q2 and the E stop LED 175 and simultaneously turning off Q1. Timer 146 is omitted and the sense wire 172 is connected to terminal B and ground. Sense wire 172 is connected to a normally open pressure switch or temperature controller or both in series to control temperature and pressure. When one or both switches close, terminal B is taken L and input 25 of NAND gate 142 goes down resetting outputs 27 and 29, turning off Q3.

Figure 4:
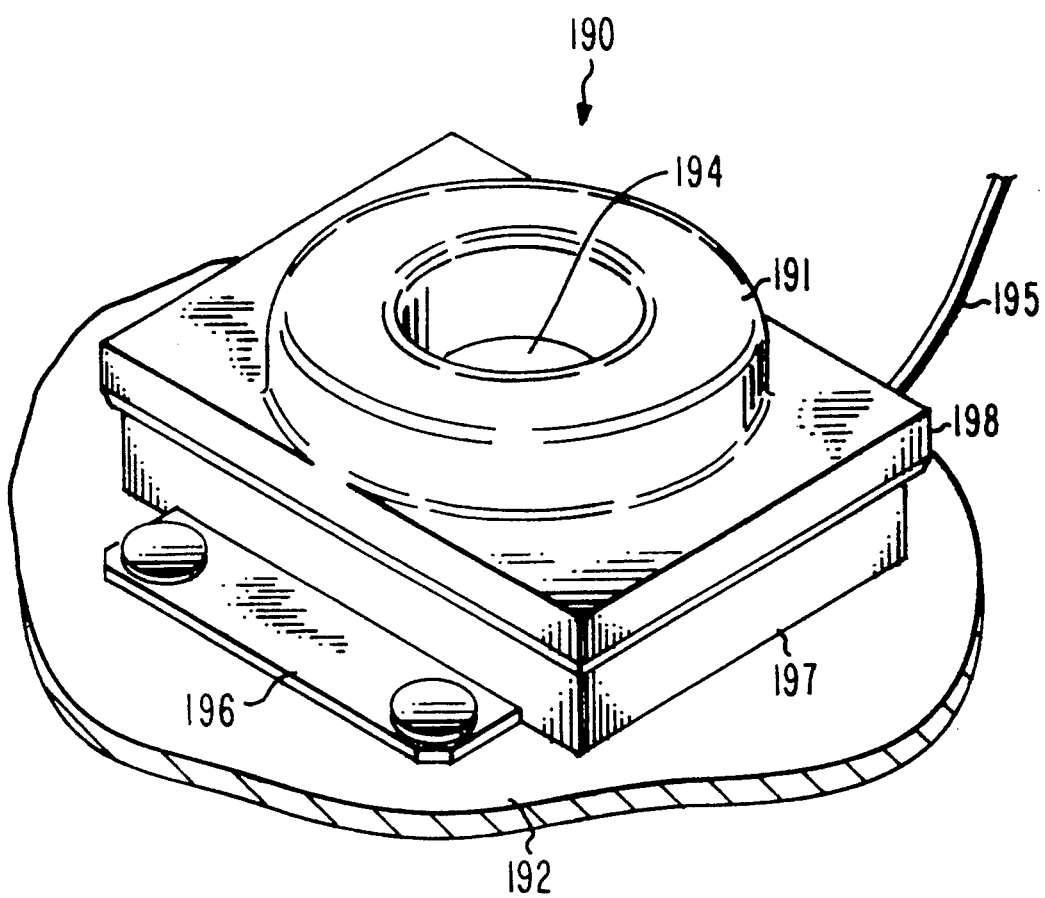
FIG. 4 is a perspective view of a photo-optic switch.

A single switch such as switch 125 or 126 shown in FIG. 1 can be configured with circuit 400 shown in FIG. 7 to perform the functions of a stand-alone DC switch. A stand-alone DC switch such as described above is shown generally in FIG. 4 as switch 190. Switch 190 is comprised of cap 198, embossed ring 191 attached to cap 198, housing 197, base 196, input-output wire 195 as infrared generator, an infrared receiver, and circuit 400. Ring 191 surrounds annular opening 194. In the preferred embodiment cap 198, ring 191, and housing 197 are an integral polymer resin molded part and circuit 400 is positioned inside annular ring 191 prior to molding. Switch 190 is shown in FIG. 4 mounted on a cut-away portion of a machine 192. Infrared LED 157, receiver 159, indicator LED 180, and indicator LED 181 are located as shown in FIG. 2 and FIG. 3. Circuit 400 consists of a dual timer circuit, as described in circuit 300, with the addition of a voltage regulator 401, two capacitors 402 and 403, and a number of NPN and PNP transistors as shown in FIG. 7. Circuit 400A is a complementary sourcing configuration supplying a positive voltage to a load connected to a ground, while 400B is a complementary sinking configuration supplying ground to a load connect to a positive voltage. Both sourcing and sinking outputs are required as some programmable controllers (machinery control computers) require sourcing inputs and some require sinking inputs.

In the quiescent state, both circuits are alike and provide +10 to +12 volts to dual timer 301 through regulator 401. Capacitors 402 and 403 remove any ripple from the 10 to +30 volt DC input. NC is a normally on output equivalent to a normally closed relay contact. NO is a normally off contact equivalent to a normally open relay contact.

In the quiescent state, circuit 400A has both NPN transistors Q3 and Q4 connected to output 321 via resistors 404 and 405 turned on, as output 321 is H. Q3 is connected to PNP transistor Q6 through resistor 406. As Q3 is turned on, the base of Q6 is L, so that it is also on, thus providing a normally closed sourcing output. Q4 is connected to NPN transistor Q7 through resistor 407 and pull up resistor 408. With Q4 on, the base of Q7 is L, preventing it from conducting and turning on PNP transistor Q8 through resistor 409.

When a finger is inserted into the annular opening 194 shown in FIG. 4, the infrared beam is interrupted, preventing photo receiver transistor 159 from conducting and taking output 321 L. With output 321 L, both Q3 and Q4 stop conducting. When Q3 stops conducting, the base of Q6 goes H, stopping it from conducting and turning off the NC output. When Q4 stops conducting, the base of Q7 is taken H by pull-up resistor 408 through resistor 407 turning on Q7 which, in turn, takes the base of PNP transistor Q8 L through resistor 409 turning on Q8 and the normally open output.

Circuit 400B in the quiescent state, like 400A, supplies regulated 10–12 volt DC through voltage regulator 401 and filter capacitors 402 and 403. Also like circuit 300, one NC and one NO output is available. With output 321 H, NPN transistors Q3 and Q4 are turned on. Q4 provides the normally closed sinking output. Q3 holds the base of Q5 L through resistor 407. When output 321 goes L in response to a finger breaking the infrared beam, Q3 and Q4 turn off. This results in Q4 turning off the normally closed output. Q3 turning off permits pull-up resistor 408 to take the base of NPN transistor Q5 H through resistor 407 turning on the normally open sinking output. The switch has a variety of applications including but not limited to machine operating cycle actuation and ON-OFF switching of electrical devices.

The enclosure, end caps, and embossed rings of the invention are constructed of metal and/or plastic depending on the environment the device is to be used in. The end cap and embossed ring are preferably a one-piece structure constructed of a polymer resin. A particular problem solved by this device is the use of the controller and/or single switches in automotive maintenance environments where the use of brake fluid is common. Brake fluid has a solvent effect on many polymers quickly degrading the components of machine controllers particularly the embossed rings. The instant invention solves this problem by constructing the end cap and embossed ring of the switches from optically clear castable epoxy. The castable epoxy can be either untinted or tinted. The castable epoxy rings are nearly impervious to the solvent effects of brake fluid. Therefore, the invention provides a machine controller and photo-optic switches which do not degrade in an automotive repair environment.

Thus, the instant invention provides a machine control which effectively occupies both operator hands during machine operation. The control has end mounted sensors which are shielded from fouling by dirt and airborne dust, is not susceptible to accidental machine actuation, and is less than 22 inches in length to allow convenient use in small spaces and to reduce user shoulder fatigue.

While the preferred embodiments have been fully described and depicted for the purposes of explaining the principles of the present invention, it will be appreciated by those skilled in the art that modification, substantiations, and changes may be made thereto without departing from the scope of the invention as set forth in the appended claims.

I claim:

1. A photo-optic control for operating a machine, said control comprising:

a. a tubular enclosure having a first end and a second end and a bore therebetween;

b. a first switch defining a first annular opening for inserting a finger of a hand therein, said first annular opening being oriented in a plane extending approximately perpendicularly with respect to the axis of said tubular enclosure, said first switch attached to said tubular enclosure at said first end;

c. a second switch defining a second annular opening for inserting a finger of a hand therein, said second annular opening being oriented in a plane extending approximately perpendicularly with respect to the axis of said tubular enclosure, said second switch attached to said tubular enclosure at said second end;

d. a solid state apparatus comprising,
  1. first and second semiconductor timing means respectively coupled to said first and second switches, respectively;
  2. a semiconductor latching means coupled to said first and second timing means;
  3. a semiconductor amplifying means coupled to said latching means;
  4. a load connected to said amplifying means wherein said load is energized by an enhanced signal from said amplifying means;

e. whereby the dual activation of said switches within a specified time of each other initiates said timing and latching means, and causes said amplifying means to conduct through said load such that an operator can safely operate machinery without danger to his limbs.

2. A digital solid state control for operating a machine, said control comprising:

a. a tubular enclosure having a first end and a second end and a bore therebetween;

b. a first photo-optic switch including a first infrared beam extending approximately perpendicularly with respect to the axis of said tubular enclosure, said first photo-optic switch attached to said tubular enclosure at said first end, said first photo-optic switch having a first switch digital solid state circuit;

c. a second photo-optic switch having a second infrared beam extending approximately perpendicularly with respect to the axis of said tubular enclosure, said second photo-optic switch attached to said tubular enclosure at said second end, said first photo-optic switch having a second switch digital solid state circuit;

d. a digital solid state control circuit having a first input, a second input, and an output, said first input electrically connected to said first switch, said second input electrically connected to said second switch, said output electrically connected to said machine, said first and second photo-optic switches constructed so that upon nearly simultaneous interruption of said first and second infrared beans, said control output activate said machine.

3. The photo-optic control of claim 2 wherein said first photo-optic switch and said second photo-optic switch are separated by about 10 to 21 inches.

4. The photo-optic control of claim 2 wherein said first photo-optic switch and said second photo-optic switch are separated by about 10 inches.

5. A photo-optic control for operating a machine, said machine actuated by an electrical actuation signal, said control comprising:

a. a tubular enclosure having a first end and a second end and a bore therebetween;

b. a first photo-optic switch attached to said tubular enclosure at said first end, said first photo-optic switch comprising:
  1. a first end cap;
  2. a first embossed ring defining a first tapered annular opening, said first ring attached to said first end cap, said first tapered annular opening being oriented in a plane extending approximately perpendicularly with respect to the axis of said tubular enclosure;
  3. a first infrared generator mounted within said first embossed ring so as to emit a first beam which bisects said first annular opening;
  4. a first infrared receiver mounted within said first embossed ring diametrically opposed to said first infrared generator for receiving said first infrared beam;
  5. a first digital switch circuit;

c. a second photo-optic switch attached to said tubular enclosure at said second end, said second photo-optic switch comprising:
  1. a second end cap;
  2. a second embossed ring defining a second tapered annular opening, said second ring attached to said second end cap, said second tapered annular opening being oriented in a plane extending approximately perpendicularly with respect to the axis of said tubular enclosure;
  3. a second infrared generator mounted within said second ring so as to emit a second infrared beam which bisects said second annular opening;
  4. a second infrared receiver mounted within said second ring diametrically opposed to said second infrared generator for receiving said second infrared beam; and
  5. a second digital switch circuit;

d. digital solid state control circuit electronically connected to said first and second digital switch circuits, the output of said switch circuits activating said control circuit, said control circuit actuating said machine upon near simultaneous interruption of receipt of said first and second infrared beams by said first and second infrared receivers.

6. The photo-optic control of claim 5 wherein the length of said tubular enclosure in the range of approximately 10 to 21 inches.

7. The photo-optic control of claim 5 wherein said tubular enclosure length is about 10 inches.

8. The photo-optic control of claim 5 wherein said end caps and said embossed rings are constructed of polymer resin.

9. The photo-optic control of claim 5 wherein said embossed rings of said first and said second photo-optic switches are constructed of castable epoxy.

* * * * *